United States Patent
Li et al.

(10) Patent No.: US 12,461,937 B2
(45) Date of Patent: Nov. 4, 2025

(54) CHANGE DATA CAPTURE STATE TRACKING FOR MULTI-REGION MULTI-MASTER NOSQL DATABASE

(71) Applicant: Google LLC, Mountain View, CA (US)

(72) Inventors: Zijie Li, New York, NY (US); Shitanshu Verma, Livingston, NJ (US); Can Tang, Brooklyn, NY (US); Gary Elliott, Larchmont, NY (US); Gregory Allen Morris, Hanover, NH (US); Thomas Robert Magrino, Mamaroneck, NY (US); Jack Timothy Dingilian, Brooklyn, NY (US); Teng Zhong, Mountain View, CA (US); Andrii Shyshkalov, Munich (DE); Siu Man Yau, Plainview, NY (US); Yijie Bu, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 145 days.

(21) Appl. No.: 18/336,932

(22) Filed: Jun. 16, 2023

(65) Prior Publication Data
US 2024/0419686 A1 Dec. 19, 2024

(51) Int. Cl.
*G06F 16/27* (2019.01)
*G06F 16/23* (2019.01)
(Continued)

(52) U.S. Cl.
CPC ........ *G06F 16/273* (2019.01); *G06F 16/2365* (2019.01); *G06F 16/256* (2019.01); *G06F 16/285* (2019.01)

(58) Field of Classification Search
CPC .... G06F 16/273; G06F 16/285; G06F 16/256; G06F 16/2365
See application file for complete search history.

(56) References Cited

U.S. PATENT DOCUMENTS 10,068,002 B1 * 9/2018 Wilczynski ......... G06F 11/3409
12,182,105 B1 * 12/2024 Holenstein ............ G06F 16/273
(Continued)

OTHER PUBLICATIONS

House, Daniel, et al. "Toward fast and reliable active-active geo-replication for a distributed data caching service in the mobile cloud." Procedia Computer Science 191 (2021) (Year: 2021).*
(Continued)

*Primary Examiner* — Mohsen Almani
(74) *Attorney, Agent, or Firm* — Shumaker & Sieffert, P.A.

(57) ABSTRACT

A method for change data capture state tracking includes accessing a distributed database including a plurality of clusters, each cluster of the plurality of clusters including a respective plurality of partitions, each cluster of the plurality of clusters configured to receive read and write operation. The method includes receiving, at a second cluster, a plurality of changes for a second table and storing the plurality of changes at a replication log. The method also includes asynchronously replicating the plurality of changes from the second table to a first table and maintaining a respective change stream position tracking a respective position in the replication log indicating one or more changes of the plurality of changes that have been replicated. The method includes receiving a read request at the first cluster requesting one or more rows of the first table and returning the respective change stream position.

20 Claims, 6 Drawing Sheets

(51) Int. Cl.
    *G06F 16/25*     (2019.01)
    *G06F 16/28*     (2019.01)

(56) References Cited

U.S. PATENT DOCUMENTS

| | | | |
|---|---|---|---|
| 2004/0230619 A1* | 11/2004 | Blanco | G06F 16/27 |
| 2006/0155945 A1* | 7/2006 | McGarvey | H04L 67/10 |
| | | | 711/159 |
| 2006/0168120 A1* | 7/2006 | Parham | H04L 67/1001 |
| | | | 714/E11.003 |
| 2018/0268044 A1* | 9/2018 | Barber | G06F 16/283 |
| 2019/0102418 A1 | 4/2019 | Vasudevan et al. | |
| 2019/0391957 A1 | 12/2019 | Ye | |
| 2020/0301947 A1 | 9/2020 | Botev et al. | |
| 2020/0409566 A1 | 12/2020 | Demoor et al. | |
| 2022/0188196 A1 | 6/2022 | Vig et al. | |
| 2022/0207036 A1* | 6/2022 | Ou | G06F 16/275 |
| 2024/0028580 A1* | 1/2024 | Zhang | G06F 16/235 |

OTHER PUBLICATIONS

Bhaskaran, S. V. "Resilient real-time data delivery for ai summarization in conversational platforms: Ensuring low latency, high availability, and disaster recovery." Journal of Intelligent Connectivity and Emerging Technologies 8.3 (2023) (Year: 2023).*

Zhang, Irene, et al. "Building consistent transactions with inconsistent replication." ACM Transactions on Computer Systems (TOCS) 35.4 (2018): 1-37. (Year: 2018).*

Zhao, Weibin, and Henning G. Schulzrinne. "A Flexible and Efficient Protocol for Multi-Scope Service Registry Replication." (2002). (Year: 2002).*

International Search Report and Written Opinion issued in related PCT Application No. PCT/US2024/033724, dated Sep. 18, 2024.

\* cited by examiner

| | | | |
|---|---|---|---|
| ROW 1 | 11:13 | 10,098 | ⋮ |
| ROW 2 | 12:13 | 3,656 | ⋮ |
| ROW 3 | 18:04 | 67 | ⋮ |
| ROW 4 | 19:27 | 908 | ⋮ |
| ROW 5 | 21:56 | 27,012 | ⋮ |
| ROW 6 | 22:12 | 12 | ⋮ |
| ROW 7 | 22:34 | 4,056 | ⋮ |
| ROW 8 | 22:38 | 33 | ⋮ |
| ROW 9 | 23:01 | 7,775 | ⋮ |
| ROW 10 | 23:53 | 921 | ⋮ |

FIG. 2

CHANGE DATA CAPTURE STATE TRACKING FOR MULTI-REGION MULTI-MASTER NOSQL DATABASE

TECHNICAL FIELD

This disclosure relates to change data capture state tracking for multi-region and multi-master databases.

BACKGROUND

A distributed cloud database can include a massive amount of data stored in a tabular format (i.e., a data table). These distributed cloud databases can be set up in many different configurations. One specific configuration of a distributed cloud database is a non-relational database that is multi-region and multi-master. Multi-region indicates that the database includes a number of communicatively coupled clusters that each stores a copy of the data table in a different region (e.g., a different geographical region). Multi-master indicates that each cluster has the ability to update and/or accept changes (e.g., writes) to the data table. Changes received at a cluster are replicated to every other cluster of the distributed cloud database such that each cluster includes a consistent copy of the data table.

SUMMARY

One aspect of the disclosure provides a computer-implemented method for change data capture state tracking for a multi-region multi-master noSQL distributed database. The computer-implemented method executed by data processing hardware that causes the data processing hardware to perform operations including accessing a distributed database including a plurality of clusters, each cluster of the plurality of clusters including a respective plurality of partitions, each cluster of the plurality of clusters configured to receive read and write operations. The respective plurality of partitions of a first cluster of the plurality of clusters stores a first table including a first respective plurality of rows, each respective partition of the respective plurality of partitions of the first cluster including a respective portion of the first respective plurality of rows. The respective plurality of partitions of a second cluster of the plurality of clusters stores a second table including a second respective plurality of rows, each respective partition of the respective plurality of partitions of the second cluster including a respective portion of the second respective plurality of rows. The operations include receiving, at the second cluster, a plurality of changes for the second table and storing the plurality of changes at a replication log. The operations also include asynchronously replicating the plurality of changes from the second table to the first table. The operations include, while asynchronously replicating the plurality of changes from the second table to the first table, for each row of the first respective plurality of rows of each respective partition of the respective plurality of partitions of the first cluster, maintaining a respective change stream position, the respective change stream position tracking a respective position in the replication log indicating one or more changes of the plurality of changes that have been replicated. The operations also include receiving a read request at the first cluster requesting one or more rows of the first respective plurality of rows, the one or more rows associated with a first subset of partitions of the respective plurality of partitions of the first cluster. The operations include in response to the read request, returning, for each respective partition of the first subset of partitions, the respective change stream position.

Implementations of the disclosure may include one or more of the following optional features. In some implementations, returning the respective change stream position includes returning an encrypted blob including the respective change stream position. The first cluster may include a plurality of nodes, and each partition of the respective plurality of partitions of the first cluster is stored on a respective node of the plurality of nodes.

In certain implementations, the respective plurality of partitions of the first cluster may be different from the respective plurality of partitions of the second cluster. In these certain implementations, each change of the plurality of changes for the second table may be associated with a respective partition of the respective plurality of partitions of the second cluster. In these certain implementations, the operations may include, for each change of the plurality of changes for the second table, determining a respective partition of the respective plurality of partitions of the first cluster that aligns to the respective partition of the respective plurality of partitions of the second cluster associated with the respective change, and adding the respective change to a respective partition replication log associated with the respective partition of the respective plurality of partitions of the first cluster. These certain implementations may include, for each change of the plurality of changes for the second table, determining that the respective partition of the respective plurality of partitions of the second cluster associated with the respective change is active.

Further, these certain implementations may include, for each change of the plurality of changes for the second table, determining that the respective partition of the respective plurality of partitions of the second cluster associated with the respective change is inactive. In these implementations, the operations may include, in response to determining that the respective partition of the respective plurality of partitions of the second cluster associated with the respective change is inactive, determining that a respective incarnation associated with the respective partition of the respective plurality of partitions of the second cluster associated with the respective change is closed.

These certain implementations may include, for a change of the plurality of changes for the second table, determining that the respective partition of the respective plurality of partitions of the second cluster associated with the respective change is new and, in response to determining that the respective partition of the respective plurality of partitions of the second cluster associated with the respective change is new, determining that the respective partition of the respective plurality of partitions of the second cluster associated with the respective change belongs to a new incarnation.

Another aspect of the disclosure provides a system for change data capture state tracking for a multi-region multi-master noSQL distributed database. The system includes data processing hardware and memory hardware in communication with the data processing hardware. The memory hardware stores instructions that when executed on the data processing hardware cause the data processing hardware to perform operations. The operations include accessing a distributed database including a plurality of clusters, each cluster of the plurality of clusters including a respective plurality of partitions, each cluster of the plurality of clusters configured to receive read and write operations. The respective plurality of partitions of a first cluster of the plurality of clusters stores a first table including a first respective plurality of rows, each respective partition of the respective plurality of partitions of the first cluster including a respective portion of the first respective plurality of rows. The respective plurality of partitions of a second cluster of the plurality of clusters stores a second table including a second respective plurality of rows, each respective partition of the respective plurality of partitions of the second cluster including a respective portion of the second respective plurality of rows. The operations include receiving, at the second cluster, a plurality of changes for the second table and storing the plurality of changes at a replication log. The operations also include asynchronously replicating the plurality of changes from the second table to the first table. The operations include, while asynchronously replicating the plurality of changes from the second table to the first table, for each row of the first respective plurality of rows of each respective partition of the respective plurality of partitions of the first cluster, maintaining a respective change stream position, the respective change stream position tracking a respective position in the replication log indicating one or more changes of the plurality of changes that have been replicated. The operations also include receiving a read request at the first cluster requesting one or more rows of the first respective plurality of rows, the one or more rows associated with a first subset of partitions of the respective plurality of partitions of the first cluster. The operations include in response to the read request, returning, for each respective partition of the first subset of partitions, the respective change stream position.

This aspect may include one or more of the following optional features.

In some implementations, returning the respective change stream position includes returning an encrypted blob including the respective change stream position. The first cluster may include a plurality of nodes, and each partition of the respective plurality of partitions of the first cluster is stored on a respective node of the plurality of nodes.

In certain implementations, the respective plurality of partitions of the first cluster may be different from the respective plurality of partitions of the second cluster. In these certain implementations, each change of the plurality of changes for the second table may be associated with a respective partition of the respective plurality of partitions of the second cluster. In these certain implementations, the operations may include, for each change of the plurality of changes for the second table, determining a respective partition of the respective plurality of partitions of the first cluster that aligns to the respective partition of the respective plurality of partitions of the second cluster associated with the respective change, and adding the respective change to a respective partition replication log associated with the respective partition of the respective plurality of partitions of the first cluster. These certain implementations may include, for each change of the plurality of changes for the second table, determining that the respective partition of the respective plurality of partitions of the second cluster associated with the respective change is active.

Further, these certain implementations may include, for each change of the plurality of changes for the second table, determining that the respective partition of the respective plurality of partitions of the second cluster associated with the respective change is inactive. In these implementations, the operations may include, in response to determining that the respective partition of the respective plurality of partitions of the second cluster associated with the respective change is inactive, determining that a respective incarnation associated with the respective partition of the respective plurality of partitions of the second cluster associated with the respective change is closed.

These certain implementations may include, for a change of the plurality of changes for the second table, determining that the respective partition of the respective plurality of partitions of the second cluster associated with the respective change is new and, in response to determining that the respective partition of the respective plurality of partitions of the second cluster associated with the respective change is new, determining that the respective partition of the respective plurality of partitions of the second cluster associated with the respective change belongs to a new incarnation.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is a schematic view of an example data table partitioned for multiple clusters.

Like reference symbols in the various drawings indicate like elements.

DETAILED DESCRIPTION

Figure 1:
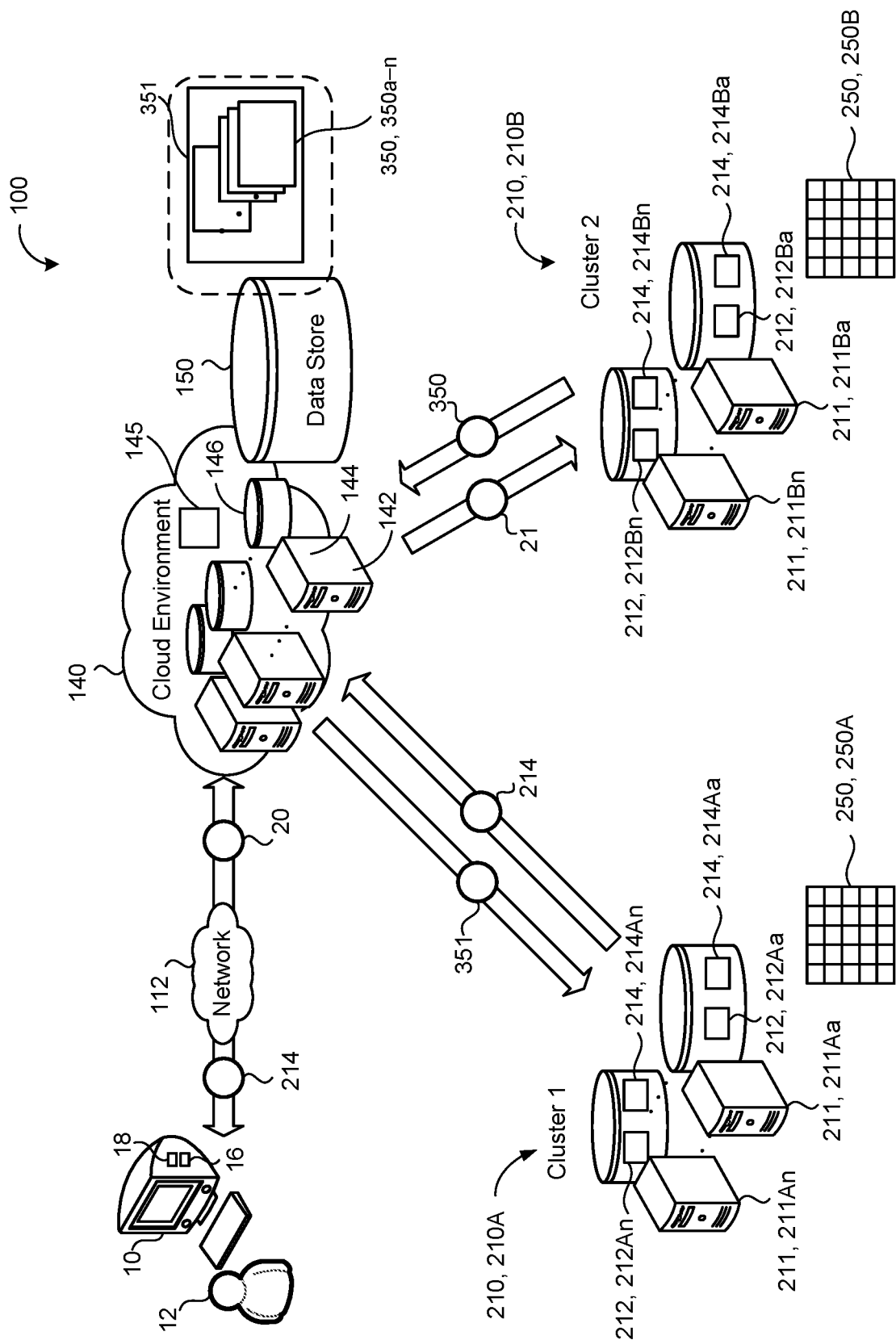
FIG. 1 is a schematic view of an example system for change data capture state tracking for a multi-region multi-master distributed database.

Some distributed cloud-based databases (e.g., noSQL databases) support multi-region and multi-master mode of operation. These distributed databases implement numerous communicatively coupled computing clusters for operation. The data stored in such a database can be organized in tables (i.e., a data table), which exist in multiple copies throughout the database (e.g., one per cluster). The clusters may be distributed across different regions (e.g., different geographic regions). As these data tables are typically massive, each data table can be partitioned (i.e., sharded) based on the contiguous range of keys into partitions (also known as "tablets" or "shards"). Typically, each partition is stored at a node of the respective cluster. Because each cluster is configured independently and includes unique resources, each cluster may partition the data table in a unique manner. That is, the partitions for each cluster may differ. Further, each cluster may repartition the data table as nodes are added/removed from the cluster.

In these distributed databases, each cluster acts as a "master," meaning that each cluster can accept changes/writes to the data table. For added reliability, changes/writes received at each cluster are replicated to the other clusters of the distributed database. These distributed databases typically implement asynchronous replication, meaning each cluster accepts mutations (i.e., changes/writes) before the mutations are replicated to other clusters. Each cluster "pulls" changes from the other clusters until the entire distributed database reaches consistency (i.e., each copy of the data table stored at each cluster is the same).

Current techniques of these distributed databases use first-in-first-out for replicating changes. In these current techniques, the distributed database stores the changes in chronological order based on timestamps and then each cluster maintains a low watermark (i.e., a time) indicating which changes have been replicated. However, this method for replicating changes between clusters does not handle interruptions (e.g., pipeline pause/resume, data repartitioning, processing nodes scaling, clusters added or removed) well as changes may be duplicated or missed. Further, discrepancies between clusters (e.g., inconsistent timestamps, different partitioning) can also cause issues when replicating changes in this manner.

Implementations herein are aimed at change data capture state tracking for a multi-region multi-master distributed database (e.g., a noSQL database). In particular, the implementations provide a granular level (e.g., row level or partition level) replication tracking in a multi-master distributed database. In some implementations, a replication module tracks, for each partition of a cluster, a change stream position indicating which changes in a replication log have been made in the respective partition. Thus, instead of relying merely on timestamps, the current disclosure tracks, for each partition or each row of each partition of a data table, the changes in the replication log that have been replicated at the respective partition.

Referring to FIG. 1, in some implementations, a replication tracking system 100 includes a distributed database 140 in communication with one or more user devices 10 via a network 112. The user device 10 may correspond to any computing device, such as a desktop workstation, a laptop workstation, or a mobile device (i.e., a smart phone) that can be used to access a cloud-based distributed database (e.g., distributed database 140). The user device 10 includes computing resources 18 (e.g., data processing hardware) and/or storage resources 16 (e.g., memory hardware).

The distributed database 140 is a distributed system (e.g., a cloud environment using multiple computers/servers) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a replication log 351 for the distributed database 140. The distributed database 140 may include a number of clusters 210, with each cluster 210 storing a local copy of a data table 250. The data table 250 has multiple rows and multiple columns. In some implementations, each cluster 210 stores the respective data table 250 in one or more partitions 212, with each partition 212 stored at a respective node 211 (i.e., a respective tablet server or a respective partition server) of the cluster 210. Each partition 212 may include one or more rows of the table 250, such that the entirety of the partitions 212 combined make up the data table 250. Further, each cluster 210 may be associated with a respective geographical region for redundancy and/or performance purposes (e.g., a user 12 accessing the distributed database 140 is directed to the cluster 210 geographically located the closest to the user 12). In some implementations, each cluster 210 is a "master," meaning that each cluster 210 can accept changes 350, 350a-n to its respective copy of the data table 250. Any changes 350 made at the data table 250 of one cluster 210 may be replicated at each other cluster 210 of the distributed database 140 to maintain consistency. In some implementations, the distributed database 140 implements replications asynchronously between clusters 210. In other words, one cluster 210 must accept the changes 350 to its respective data table 250 before the changes 350 are propagated to the other clusters 210 of the distributed database 140.

The distributed database 140 implements a replication module 145 to maintain the distributed database 140 and the replication log 351. For example, the replication module 145 is executed by one or more of the nodes 211 of each cluster 210. The replication module 145 is configured to receive read operations 20 (also referred to herein as just reads 20) and write operations 21 (also referred to herein as just writes 21) from, for example, a user device 10 associated with a respective user 12 via the network 112. The read 20 operations may be requests from a user 12 for data from the data table 250 (e.g., one or more rows and/or one or more columns of the data table 250). The write operations 21 may be instructions to change data of the data table 250 (resulting in one or more changes 350). For example, a write operation 21 adds, removes, or modifies one or more rows and/or columns of the data table 250. The replication module 145 may store changes 350 associated with the write operation 21 at the replication log 351 at the data store 150. In some implementations, the replication module 145 maintains a partition replication log 351 for each partition 212 of each cluster 210. In other words, any changes 350 associated with a specific partition 212 are stored at a specific partition replication log 351 associated with the specific partition 212.

Figure 3A:
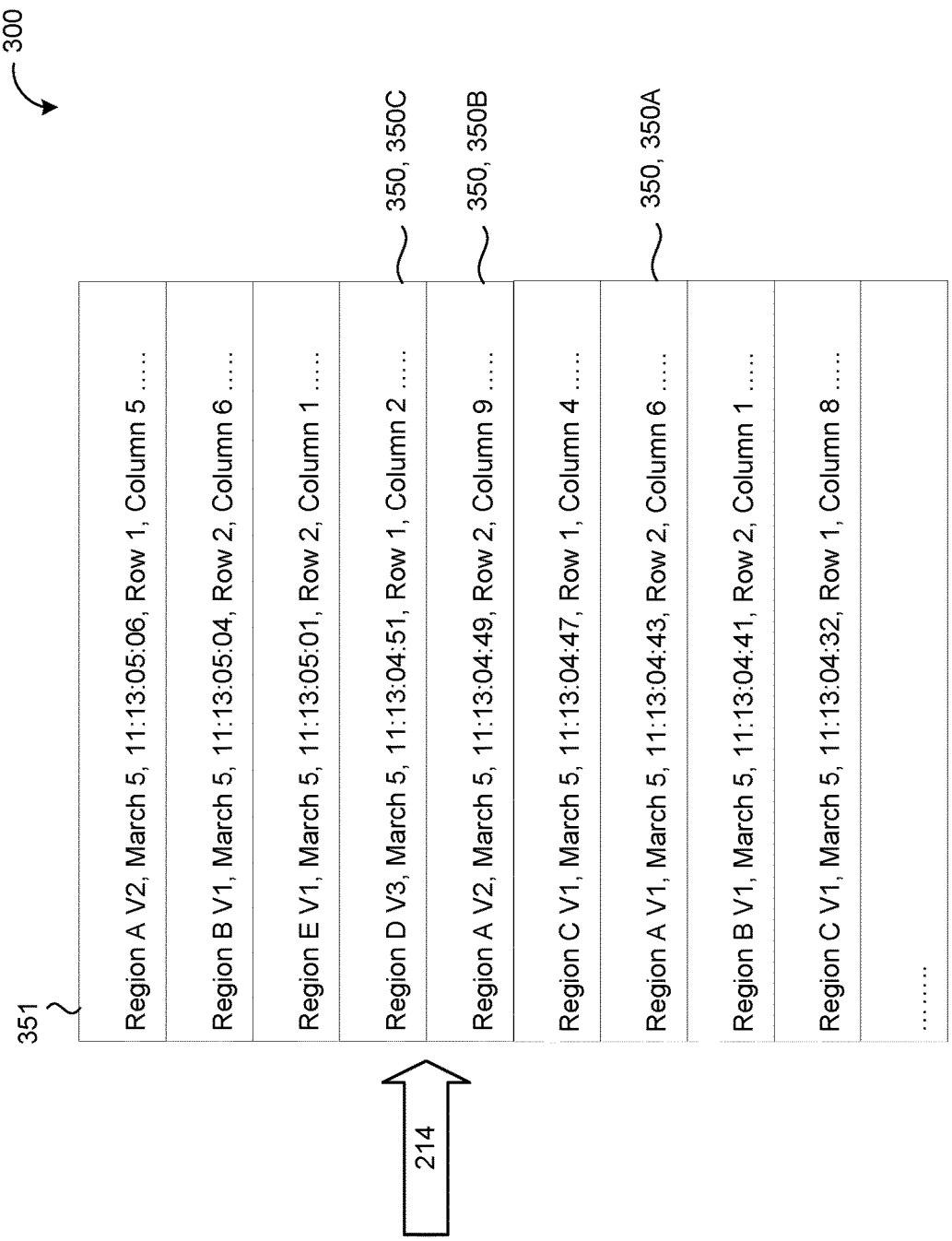
FIG. 3A is a schematic view of an example change stream position for a partition replication log.

The replication module 145 may be configured to track replication progress for each partition 212 of each cluster 210 using a respective change stream position 214. As an illustrative example, the replication module 145 receives one or more writes 21 (e.g., from user 12 associated with the client device 10) for a cluster 210, 210B. The replication module 145 then executes the writes 21 at the data table 250, 250B associated with the cluster 210B (i.e., local to the cluster 210B). In particular, the replication module 145 executes the writes 21 at any relevant partition 212B from a plurality of partitions 212, 212Ba-n of the cluster 210B at the respective node 211B of the plurality of nodes 211, 211Ba-n (i.e., the partitions 212 that include one or more rows affected by the write 21). The replication module 145 stores the changes 350 associated with the writes 21 at the replication log 351. The replication module 14 asynchronously replicates the changes 350 at the cluster 210B to another cluster 210, 210A. Here, the replication module 145 propagates the changes 350 to a data table 250, 250A of cluster 210A. The data table 250A is a copy of the data table 250B that is local to the cluster 210A. In particular, the replication module 145 replicates the changes 350 of the replication log 351 to any relevant partition 212, 212A of the plurality of partitions 212, 212Aa-n at the respective node 211, 211A of the plurality of nodes 211Aa-n. As the replication module 145 replicates the changes 350 to the cluster 210A, the replication module 145 maintains a plurality of change steam positions 214, 214Aa-n for each partition 212A of the cluster 210A. The change stream position 214A indicates a respective position in the replication log 351 that indicates one or more changes 350 of the plurality of changes 350a-n that have been replicated at the respective partition 212A, as discussed in greater detail below (FIG. 3A). In response to a read operation 20 directed to the cluster 210A, the replication module 145 transmits the data requested by the read 20 from the data table 250A, as well as each change stream position 214A associated with each partition 212A invoked in the read 20. The replication module 145 may transmit the change stream position 214 as an encrypted blob or any other container. In this manner, the user 12 is able to assess the accuracy of the data (i.e., how current the data is relative to the state of the data tables 250 of other clusters 210) received in response to the read 20. Further, the replication module 145 maintains a plurality of change stream positions 214, 214Ba-n for cluster 210B tracking the replication status (in terms of the replication log 351) of each partition 212B for changes 350 made at each other cluster 210 of the distributed database 140.

The system 100 of FIG. 1 is presented for illustrative purposes only and is not intended to be limiting. For example, although only a single example of each component is illustrated, the system 100 may include any number of components 10, 112, 140, 145, 150, and 210. Further, although some components are described as being located in a cloud computing environment 140, in some implementations, some or all of the components may be hosted locally on the user device 10. Further, in various implementations, some or all of the replication module 145 is hosted locally on user device 110, remotely (such as in the cloud computing environment 140), or some combination thereof.

FIG. 2 is a schematic view 200 of an example data table 250 that is partitioned for two separate clusters 210A and 210B. The replication module 145 (FIG. 1) divides the data table 250 into partitions 212 based on resources available at the respective cluster 210. For example, if a cluster 210 has access to many nodes 211 and/or storage capacity, the replication module 145 divides the data table 250 into many small partitions 212. As the cluster 210 adds or removes nodes, the replication module 145 can repartition the data table 250 as necessary.

In the example of FIG. 2, an exemplary data table 250 is partitioned uniquely for each of two clusters 210A and 210B (not pictured). The cluster 210A has a first partition 212, 212Aa and a second partition 212, 212Ab. The first partition 212Aa of the cluster 210A includes the first five rows of the data table 250. The second partition 212Ab of the cluster 210A includes the next five rows of the data table 250. In contrast, the cluster 210B has a first partition 212, 212Ba, a second partition 212, 212Bb, and a third partition 212, 212Bc. Here, the first partition 212Ba of the cluster 210B includes rows 1-3 of data table 250, the second partition 212Bb of the cluster 210B includes rows 4-6 of data table 250, and the third partition 212Bc of the cluster 210B includes rows 7-10 of data table 250.

As the clusters 210 are not required to partition the data table 250 in the same way, it can be difficult to synchronize replication between clusters. In the example of FIG. 2, when the replication module 145 makes a change 350 to the first partition 212Ba of the cluster 210B, the replication module 145 can map the change 350 directly to the first partition 212Aa of the cluster 210A. Here, the replication module 145 can align a partition replication log 351 associated with the first partition 212Ba of the cluster 210B directly to the first partition 212Aa of the cluster 210A. In other words, any changes 350 made to the first partition 212Ba (i.e., to rows 1-3 of the data tables 250) of cluster 210B will also be made at the first partition 212Aa of the cluster 210A. However, the inverse relationship does not hold. When the replication module 145 makes a change 350 to the first partition 212Aa of the cluster 210A, the replication module 145 will not necessarily replicate the change 350 at the first partition 212Ba of the cluster 210B. Instead, the replication module 145 must determine whether to replicate the changes to the first partition 212Ba or the second partition 212Bb of the cluster 210B based on the row of the data table 250 (and/or the first partition 212Aa of the cluster 210A) associated with the change 350.

In some implementations, the replication module 145 maintains a partition replication log 351 for each partition 212 of a cluster 210. The partition replication log 351 may include any changes 350 made at the partition 212. Alternatively, the partition replication log 351 may include any changes 350 that need to be replicated at the partition 212. In some implementations, the replication module 145 maintains the change stream position 214 at the partition replication log 351, which tracks the changes 350 of the partition replication log 351 that have been replicated at the partition 212.

FIG. 3A illustrates a schematic view 300 of a replication log 351 including changes 350, 350A-C and a change stream position 214. The replication log 351 may be a partition replication log 351 indicating changes 350 that need to be made at a particular partition 212. In the example of FIG. 3A, the change stream position 214 indicates that each change 350 up to, and including, change 350, 350B has been replicated at the partition 212 and that change 350, 350C and any change 350 after has not been replicated at the partition 212.

Each change 350 of the replication log 351 may include various details such as the region (e.g., the cluster 210), a date, a time, a cell of the data table 250, etc. associated with the change 350. The replication module 145 may store or maintain "incarnations" (i.e., versions) of clusters 210, partitions 212, or some combination thereof. Incarnations refer to periods of time when the cluster 210 and/or the partition 212 are active. For example, the change 350, 350A is associated with a region "A V1" and the change 350B is associated with a region "A V2." In this example, these regions represent different incarnations (V1 and V2) of the same region A (i.e., cluster 210). In some implementations, the replication module 145 determines that a cluster 210 is inactive when the cluster 210 is no longer accepting writes 21. The replication module 145 may close the incarnation associated with the inactive cluster 210. Conversely, when the replication module 145 determines that a cluster 210 is new and/or reactivated (e.g., accepting writes 21), the replication module 145 may generate a new incarnation for the cluster 210. The replication module 145 may similarly maintain incarnations for partitions 212.

By maintaining incarnations, the replication module 145 can easily handle addition/removal of clusters and/or partitions in the distributed database 140 and associated metadata (e.g., replication logs 351). For example, when an incarnation of a cluster 210 is closed, the replication module 145 can determine that every change 350 associated with the cluster 210 has been replicated to every other cluster of the distributed database 140. Accordingly, the replication module 145 does not need to track or maintain the closed incarnation of the cluster 210 as the closed incarnation of the cluster 210 can no longer make changes 350 to the distributed database. If a new incarnation of the cluster 210 begins, the replication module 145 begins tracking the new incarnation (i.e., maintaining a replication log 351 associated with the new incarnation of the cluster).

Figure 3B:
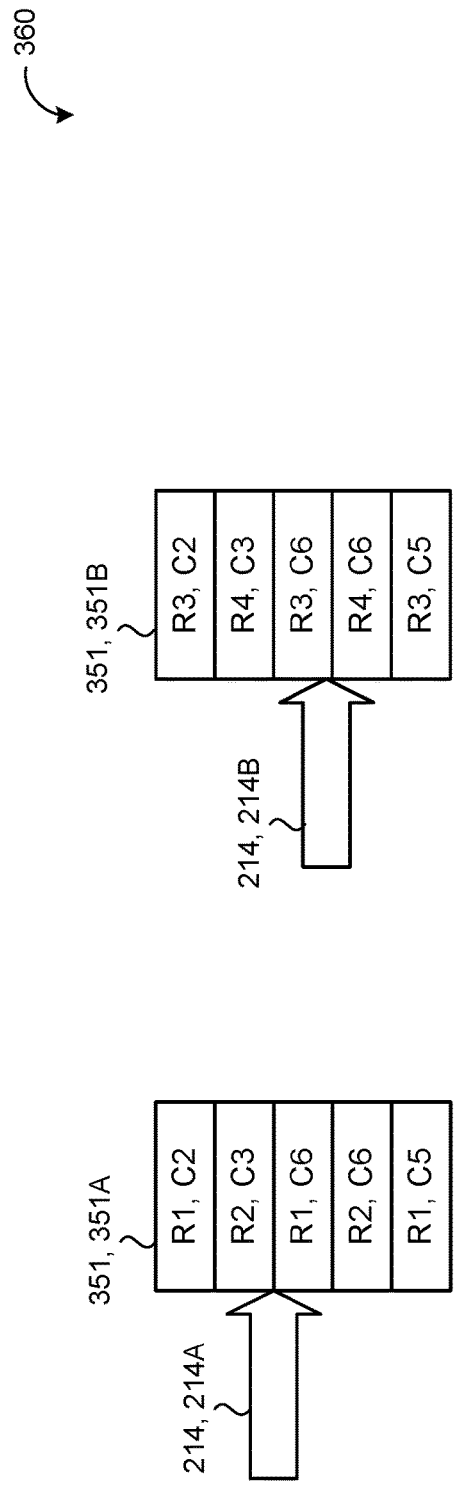
FIG. 3B is a schematic view of an example change stream position for a partition replication log after repartitioning.
Figure 3B:
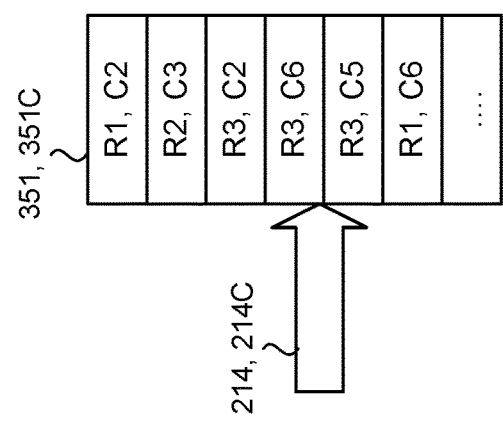

FIG. 3B illustrates a schematic view 360 of an example change stream position 214 for a partition replication log 351 after repartition. In the example of FIG. 3, a partition replication log 351, 351A includes changes for a partition 212 that includes rows R1 and R2. The partition replication log 351A has an associated change stream position 214, 214A indicating the changes 350 in the partition replication log 351A that have been replicated at the partition 212. Similarly, a partition replication log 351, 351B includes changes for a partition 212 that includes rows R3 and R4. The partition replication log 351B has an associated change stream position 214, 214B indicating the changes 350 in the partition replication log 351B that have been replicated at the partition 212. As illustrated in the example of FIG. 3B, if the replication module 145 repartitions the cluster 210 such that a new partition 212 includes rows R1 R2, and R3, the replication module 145 must determine a new change stream positions 214, 214C for a new partition replication log 351, 351C. Here, the replication module 145 determines which changes 350 from the partition replication logs 351A and 351B are relevant to the new partition 212 and adds those changes to the new partition replication log 351C. The replication module 145 then determines the change stream position 214C based on the changes 350 of the partition replication log 351 that have been replicated (based on the change stream positions 214A and 214B). In this manner, the replication module 145 can handle changes to partitions 212 (i.e., repartitioning of clusters 210) without relying merely on timestamps.

Figure 4:
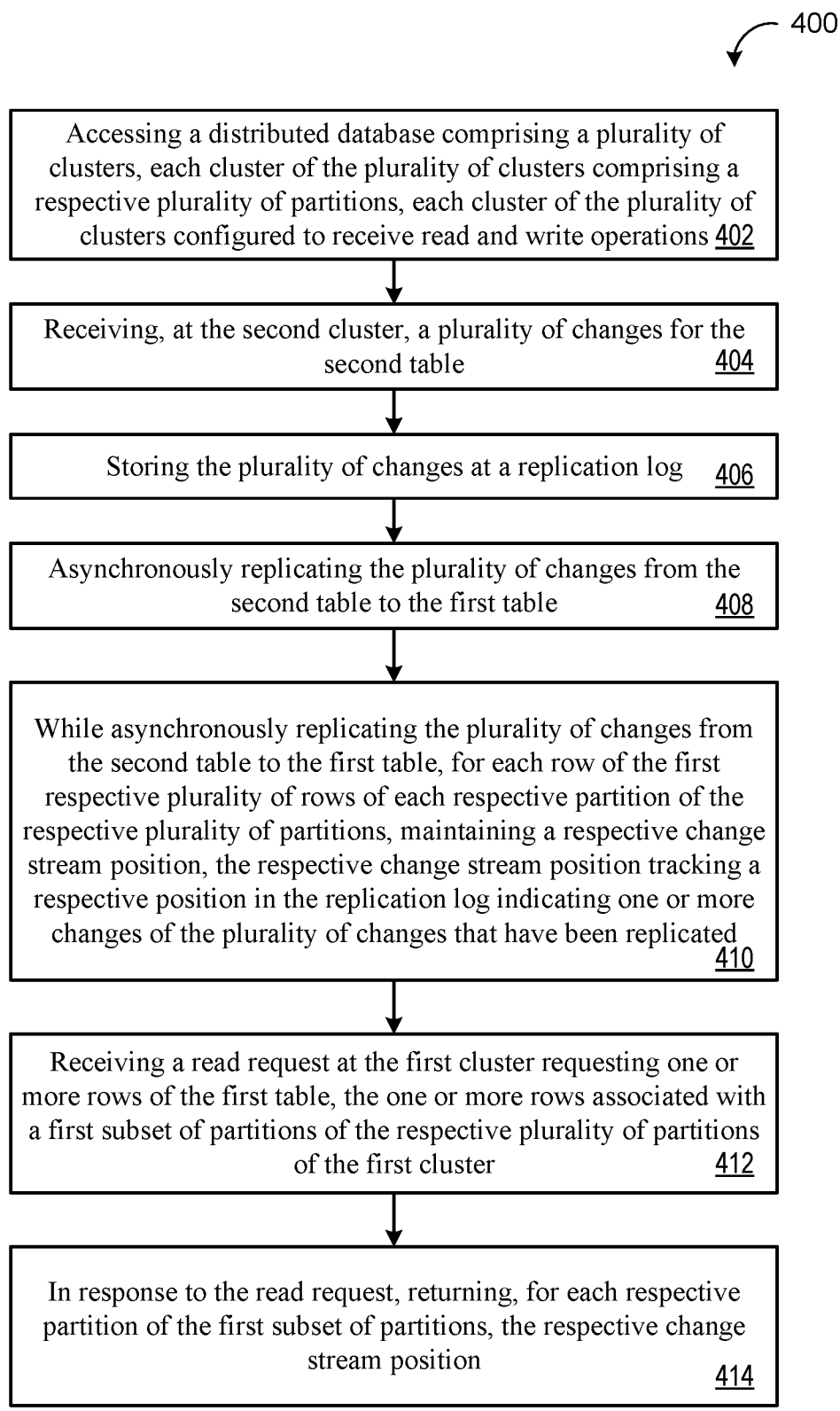
FIG. 4 a flowchart of an example arrangement of operations for a method of change data capture state tracking for a multi-region multi-master distributed database.

FIG. 4 is a flowchart of an exemplary arrangement of operations for a method 400 of change data capture state tracking for a multi-region multi-master distributed database (e.g., a noSQL database). The method 400 may be performed, for example, by various elements of the replication tracking system 100 of FIG. 1 and/or the computing device 500 of FIG. 5. At operations 402, the method 400 includes accessing a distributed database 140 including a plurality of clusters 210, each cluster 210 of the plurality of clusters 210 including a respective plurality of partitions 212, each cluster 210 of the plurality of clusters configured to receive read operations 20 and write operations 21. The respective plurality of partitions 212, 212Aa-n of a first cluster 210, 210A of the plurality of clusters 210 stores a first table 250, 250A including a first respective plurality of rows, each respective partition 212A of the respective plurality of partitions 212Aa-n of the first cluster 210A including a respective portion of the first respective plurality of rows. The respective plurality of partitions 212, 212Ba-n of a second cluster 210, 210B of the plurality of clusters 210 stores a second table 250, 250B including a second respective plurality of rows, each respective partition 212B of the respective plurality of partitions 212Ba-n of the second cluster 210B including a respective portion of the second respective plurality of rows At operation 404, the method 400 includes receiving, at the second cluster 210B, a plurality of changes 350, 350a-n for the second table 250B. At operations 406, the method 400 includes storing the plurality of changes 350a-n at a replication log 351. At operations 408, the method 400 includes asynchronously replicating the plurality of changes 350a-n from the second table 250B to the first table 250A. At operations 410, the method 400 includes, while asynchronously replicating the plurality of changes 350a-n from the second table 250B to the first table 250A, for each row of the first respective plurality of rows of each respective partition 212A of the respective plurality of partitions 212Aa-n of the first cluster 210A, maintaining a respective change stream position 214, 214A. The respective change stream position 214A tracks a respective position in the replication log 351 that indicates one or more changes 350 of the plurality of changes 350a-n that have been replicated. At operations 412, the method 400 includes receiving a read request or read operation 20 at the first cluster 210A requesting one or more rows of the first respective plurality of rows, the one or more rows associated with a first subset of partitions 212A of the respective plurality of partitions 212Aa-n of the first cluster 210A. At operations 414, the method 400 includes, in response to the read request 20, returning, for each respective partition 212A of the first subset of partitions 212A, the respective change stream position 214A.

Figure 5:
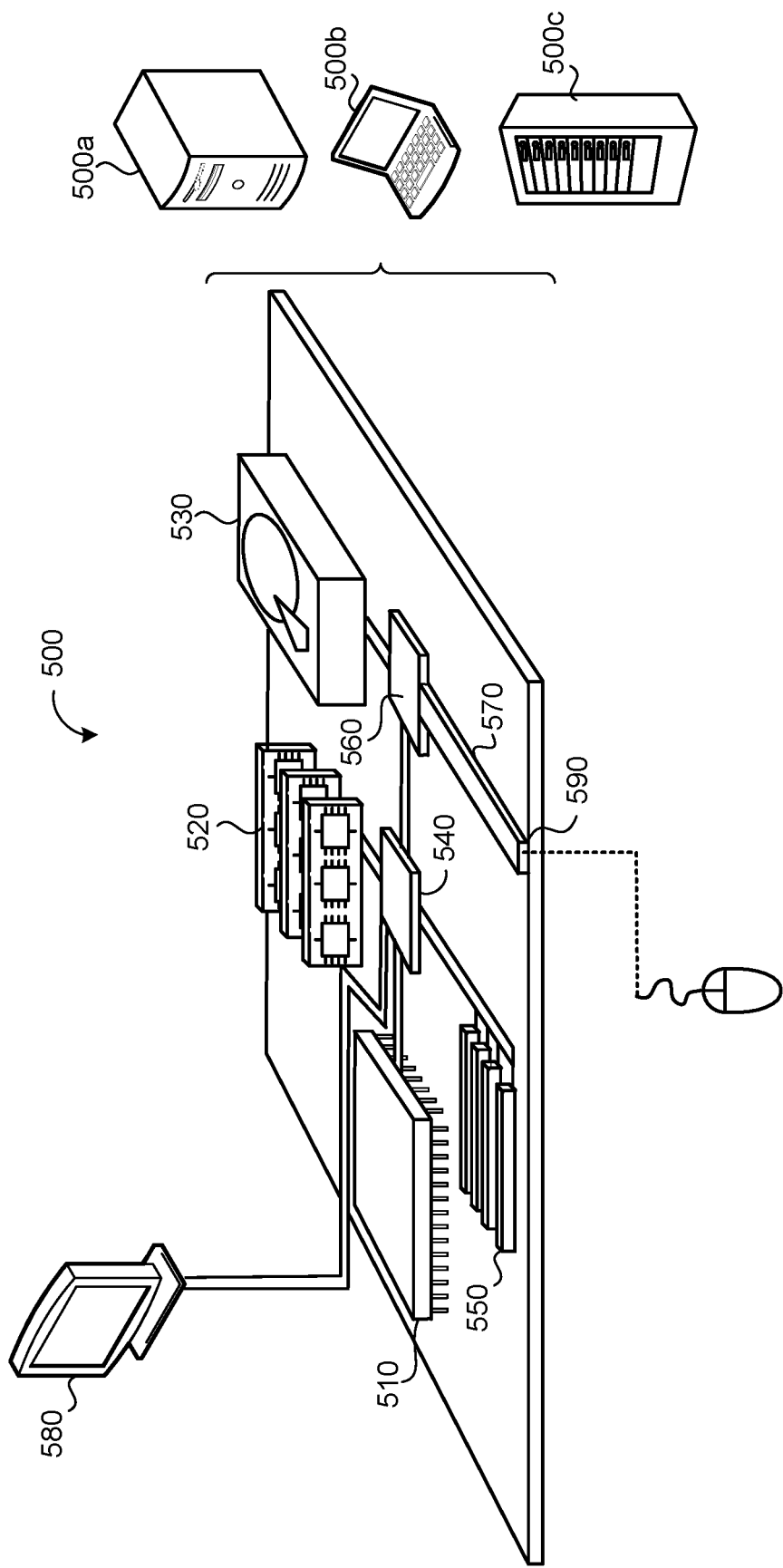
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   accessing a distributed database comprising a plurality of clusters, each cluster of the plurality of clusters comprising a respective plurality of partitions, each cluster of the plurality of clusters configured to receive read and write operations, wherein:
   the respective plurality of partitions of a first cluster of the plurality of clusters stores a first table comprising a first respective plurality of rows, each respective partition of the respective plurality of partitions of the first cluster comprising a respective portion of the first respective plurality of rows; and
   the respective plurality of partitions of a second cluster of the plurality of clusters stores a second table comprising a second respective plurality of rows, each respective partition of the respective plurality of partitions of the second cluster comprising a respective portion of the second respective plurality of rows;

receiving, at the second cluster, a plurality of changes for the second table;

storing the plurality of changes at a replication log;

asynchronously replicating the plurality of changes from the second table to the first table;

while asynchronously replicating the plurality of changes from the second table to the first table, for each row of the first respective plurality of rows of each respective partition of the respective plurality of partitions of the first cluster, maintaining a respective change stream position, the respective change stream position tracking a respective position in the replication log indicating one or more changes of the plurality of changes that have been replicated;

receiving a read request at the first cluster requesting one or more rows of the first respective plurality of rows, the one or more rows associated with a first subset of partitions of the respective plurality of partitions of the first cluster; and in response to the read request, returning, for each respective partition of the first subset of partitions, the respective change stream position.

2. The method of claim 1, wherein returning the respective change stream position comprises returning an encrypted blob comprising the respective change stream position.

3. The method of claim 1, wherein the respective plurality of partitions of the first cluster is different from the respective plurality of partitions of the second cluster.

4. The method of claim 3, wherein each respective change of the plurality of changes for the second table is associated with a respective partition of the respective plurality of partitions of the second cluster.

5. The method of claim 4, wherein the operations further comprise, for each respective change of the plurality of changes for the second table:

determining a different partition of the respective plurality of partitions of the first cluster that aligns with the respective partition of the respective plurality of partitions of the second cluster associated with the respective change; and adding the respective change to a respective partition replication log associated with the respective partition of the respective plurality of partitions of the first cluster.

6. The method of claim 4, wherein the operations further comprise, for each respective change of the plurality of changes for the second table, determining that the respective partition of the respective plurality of partitions of the second cluster associated with the respective change is active.

7. The method of claim 4, wherein the operations further comprise, for each respective change of the plurality of changes for the second table, determining that the respective partition of the respective plurality of partitions of the second cluster associated with the respective change is inactive.

8. The method of claim 7, wherein the operations further comprise, in response to determining that the respective partition of the respective plurality of partitions of the second cluster associated with the respective change is inactive, determining that a respective incarnation associated with the respective partition of the respective plurality of partitions of the second cluster associated with the respective change is closed.

9. The method of claim 4, wherein the operations further comprise, for a respective change of the plurality of changes for the second table:

determining that the respective partition of the respective plurality of partitions of the second cluster associated with the respective change is new; and in response to determining that the respective partition of the respective plurality of partitions of the second cluster associated with the respective change is new, determining that the respective partition of the respective plurality of partitions of the second cluster associated with the respective change belongs to a new incarnation.

10. The method of claim 1, wherein:

the first cluster comprises a plurality of nodes; and each partition of the respective plurality of partitions of the first cluster is stored on a respective node of the plurality of nodes.

11. A system comprising:

data processing hardware; and memory hardware in communication with the data processing hardware, the memory hardware storing instructions that when executed on the data processing hardware cause the data processing hardware to perform operations comprising:

accessing a distributed database comprising a plurality of clusters, each cluster of the plurality of clusters comprising a respective plurality of partitions, each cluster of the plurality of clusters configured to receive read and write operations, wherein:

the respective plurality of partitions of a first cluster of the plurality of clusters stores a first table comprising a first respective plurality of rows, each respective partition of the respective plurality of partitions of the first cluster comprising a respective portion of the first respective plurality of rows; and the respective plurality of partitions of a second cluster of the plurality of clusters stores a second table comprising a second respective plurality of rows, each respective partition of the respective plurality of partitions of the second cluster comprising a respective portion of the second respective plurality of rows;

receiving, at the second cluster, a plurality of changes for the second table;

storing the plurality of changes at a replication log;

asynchronously replicating the plurality of changes from the second table to the first table;

while asynchronously replicating the plurality of changes from the second table to the first table, for each row of the first respective plurality of rows of each respective partition of the respective plurality of partitions of the first cluster, maintaining a respective change stream position, the respective change stream position tracking a respective position in the replication log indicating one or more changes of the plurality of changes that have been replicated;

receiving a read request at the first cluster requesting one or more rows of the first respective plurality of rows, the one or more rows associated with a first subset of partitions of the respective plurality of partitions of the first cluster; and in response to the read request, returning, for each respective partition of the first subset of partitions, the respective change stream position.

12. The system of claim 11, wherein returning the respective change stream position comprises returning an encrypted blob comprising the respective change stream position.

13. The system of claim 11, wherein the respective plurality of partitions of the first cluster is different from the respective plurality of partitions of the second cluster.

14. The system of claim 13, wherein each respective change of the plurality of changes for the second table is associated with a respective partition of the respective plurality of partitions of the second cluster.

15. The system of claim 14, wherein the operations further comprise, for each respective change of the plurality of changes for the second table:
   determining a different partition of the respective plurality of partitions of the first cluster that aligns with the respective partition of the respective plurality of partitions of the second cluster associated with the respective change; and
   adding the respective change to a respective partition replication log associated with the respective partition of the respective plurality of partitions of the first cluster.

16. The system of claim 14, wherein the operations further comprise, for each respective change of the plurality of changes for the second table, determining that the respective partition of the respective plurality of partitions of the second cluster associated with the respective change is active.

17. The system of claim 14, wherein the operations further comprise, for each change of the plurality of changes for the second table, determining that the respective partition of the respective plurality of partitions of the second cluster associated with the respective change is inactive.

18. The system of claim 17, wherein the operations further comprise, in response to determining that the respective partition of the respective plurality of partitions of the second cluster associated with the respective change is inactive, determining that a respective incarnation associated with the respective partition of the respective plurality of partitions of the second cluster associated with the respective change is closed.

19. The system of claim 14, wherein the operations further comprise, for a respective change of the plurality of changes for the second table:
   determining that the respective partition of the respective plurality of partitions of the second cluster associated with the respective change is new; and
   in response to determining that the respective partition of the respective plurality of partitions of the second cluster associated with the respective change is new, determining that the respective partition of the respective plurality of partitions of the second cluster associated with the respective change belongs to a new incarnation.

20. The system of claim 11, wherein:
the first cluster comprises a plurality of nodes; and
each partition of the respective plurality of partitions of the first cluster is stored on a respective node of the plurality of nodes.

* * * * *